United States Patent [19]

Bauer

[11] 4,132,446
[45] Jan. 2, 1979

[54] ARMORED CAR WINDOW AND WINDSHIELD

[76] Inventor: Russell E. Bauer, 920 Lakeshore Dr., Grosse Pointe Shores, Mich. 48236

[21] Appl. No.: 842,223

[22] Filed: Oct. 14, 1977

[51] Int. Cl.² ........................... B60J 1/16; F41H 1/00
[52] U.S. Cl. ..................................... 296/155; 49/425; 89/36 H
[58] Field of Search ................. 296/84, 146, 1 R, 155; 49/425; 109/17, 49.5; 89/36 H, 36 T, 36 L; 102/40 B

[56] References Cited

U.S. PATENT DOCUMENTS

| 1,504,949 | 8/1924 | Gibbs | 89/36 H |
| 2,834,069 | 5/1958 | Perrone | 49/425 |

Primary Examiner—Philip Goodman
Attorney, Agent, or Firm—Hauke and Patalidis

[57] ABSTRACT

A window and windhsield structure for vehicle bodies, and more particularly armored cars and the like provided with bulletproof glass windows and windshields. The window and windshield structure of the invention consists of a block or pane of bulletproof glass mounted in a frame having overall dimensions overlapping a porthole opening formed in the vehicle body. The lower portion of the frame is provided with a pair of rollers rollingly engaging the bottom surface of a channel permanently mounted in the interior of the body proximate the bottom edge of the opening. The framed block or pane of glass is held along its upper edge by means of an angle-iron channel strip removably mounted proximate the upper edge of the opening parallel to the lower angle-iron bracket. Windows for covering an opening in a panel disposed at an angle relative to the vertical, such as the windshield of a motor vehicle, are preferably provided with one or more rollers each having its axis of rotation disposed at a right angle relative to the axis of rotation of the rollers mounted at the bottom of the frame, the periphery of each roller engaging the inner wall surface of the removable top angle-iron channel strip, thus supporting part of the weight of the window, reducing friction and facilitating manual sliding of the window frame. The moveable window frame may be locked in any position by means of one or more wing bolts projecting through the side of the lower channel and engaging a lateral surface of the brackets holding the lower rollers.

9 Claims, 7 Drawing Figures

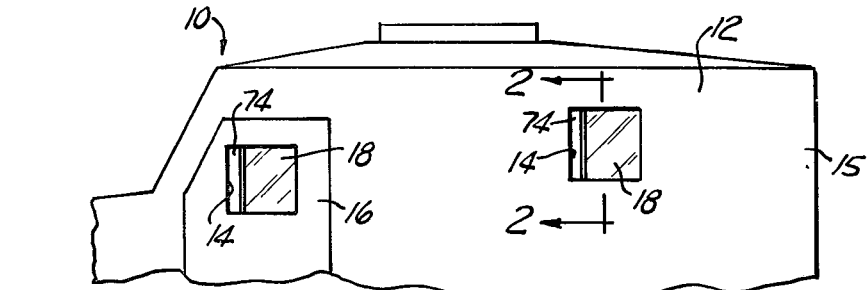
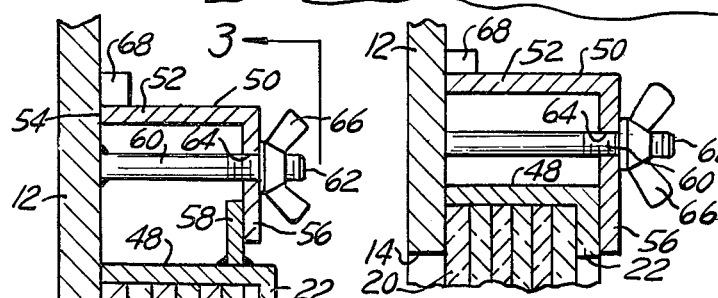
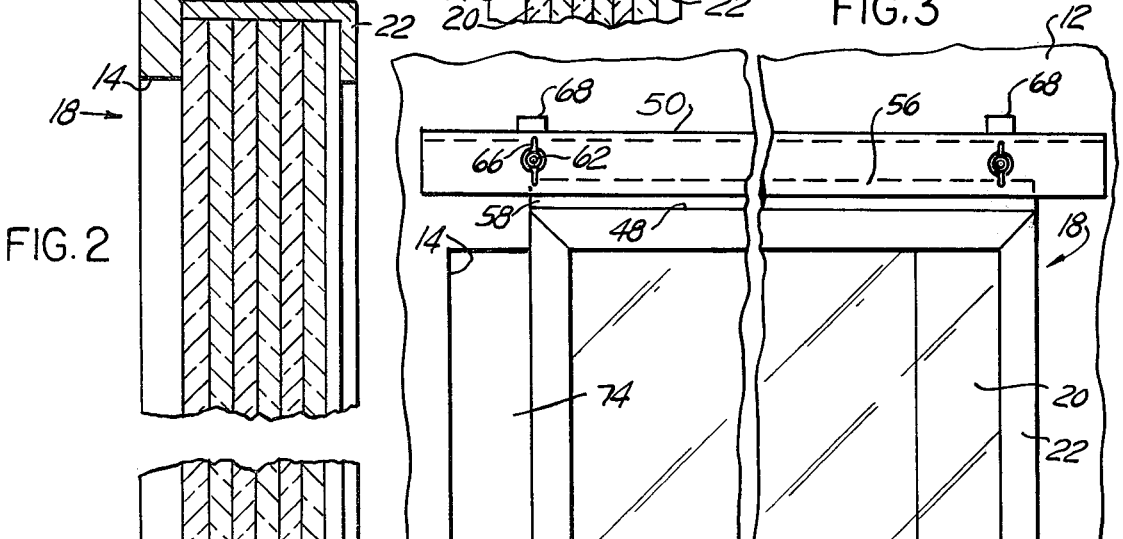
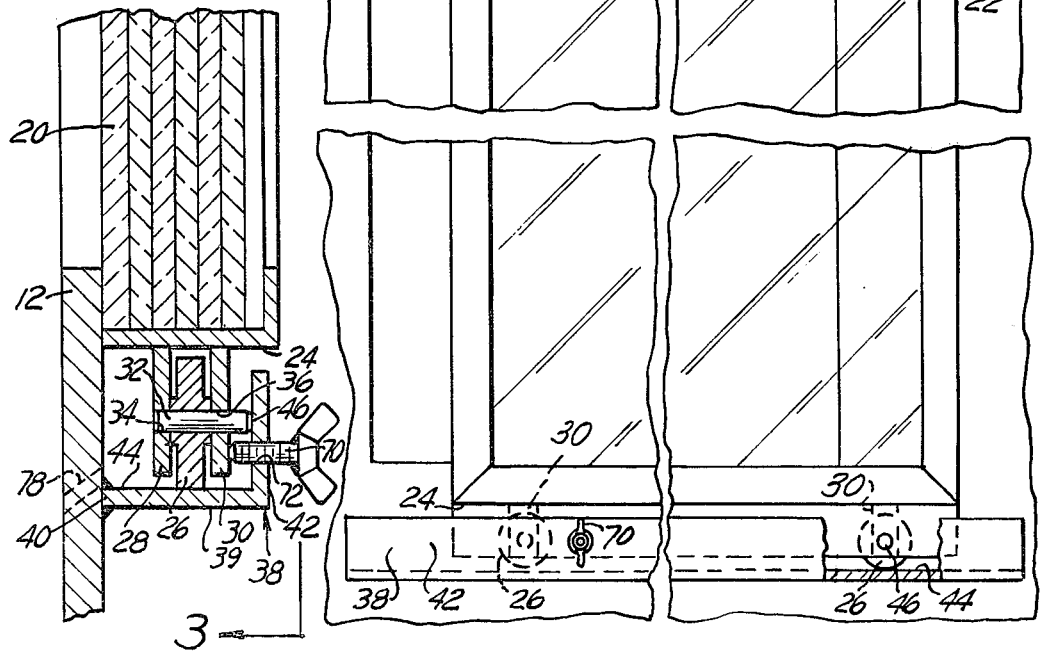

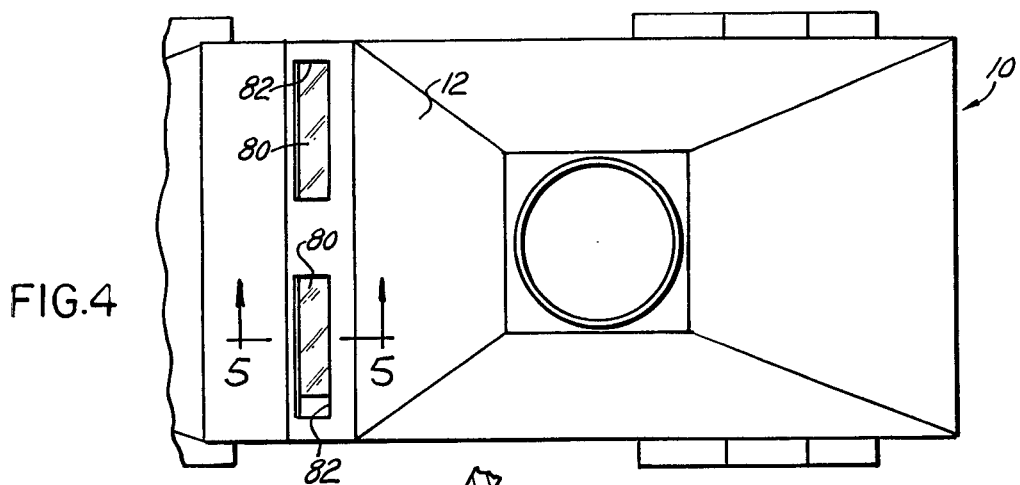
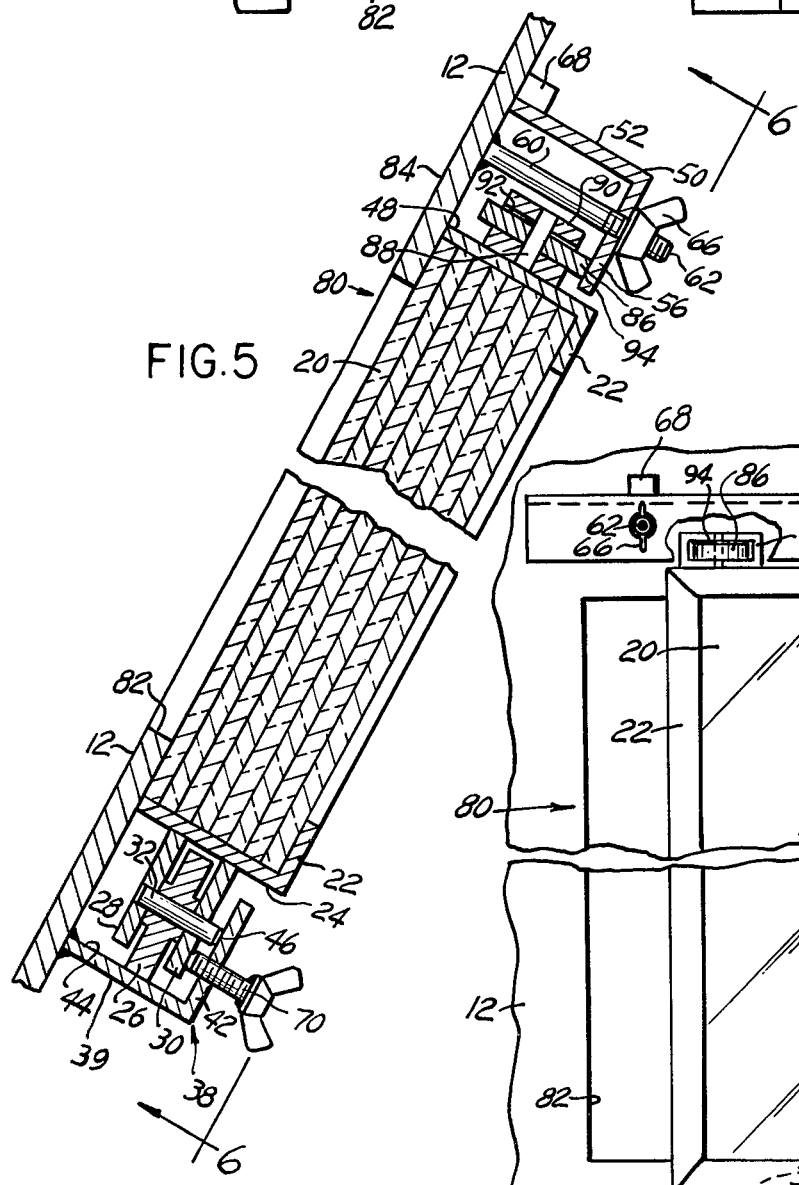
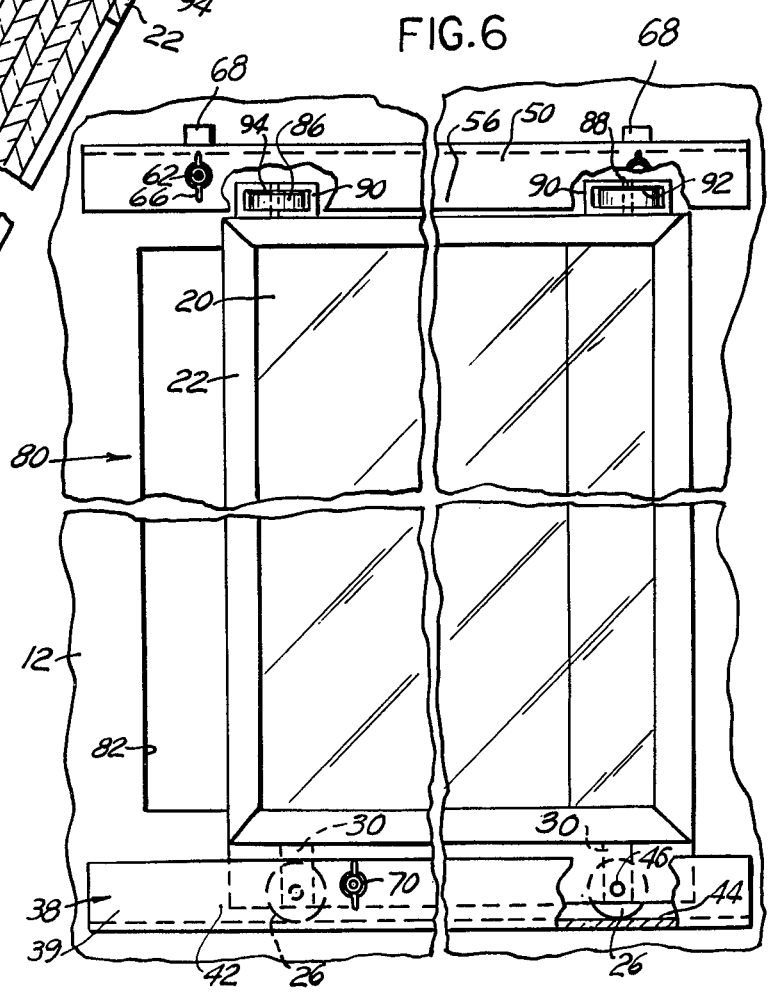

ARMORED CAR WINDOW AND WINDSHIELD

BACKGROUND OF THE INVENTION

The present invention relates to sliding windows and windshields for vehicle closed bodies and more particularly for armored cars or other vehicles provided with windows or windshields made of heavy glass such as bulletproof glass and the like.

Vehicles such as armored cars, armored troop carriers, armored escort vehicles, combat tanks and the like are sometimes provided with fixed windshield and windows made of heavy bulletproof glass. Openings or ports through the body shell may be provided at different locations for aiming and firing diverse hand-held weapons. The firing port openings are generally in the form of vertical slits normally obturated by cover plates, when not in use, and they generally offer limited vision when uncovered, as they must be of a relatively narrow size to afford adequate protection to the crew. In addition to providing limited vision, the firing slits have a finite width which may be too wide or too narrow to provide passage for a firearm of a given size and they limit the azimuth angle of aiming of the weapon.

Windows for armored vehicles must necessarily be made of heavy blocks of bulletproof glass, capable of preventing penetration through the glass of at least small caliber bullets. However, even if originally bulletproof, such blocks of glass may become somewhat damaged under combat conditions and, when cracked, they tend to obscure vision and then become relatively fragile and no longer bulletproof. For those reasons, armored cars and like vehicles are often provided with removable window blocks which are bolted from the inside over the body openings and which can be replaced by the crew when damaged. However, when mounted such as to cover the body openings, each glass block is held in a fixed position, thus preventing ventilation of the interior of the vehicle through the openings, and requiring that weapons be fired only through the firing slits.

The present invention remedies the inconveniences of the prior art by providing slidable windows and windshields which normally obturate the openings in the body shell of an armored vehicle, but which can be easily and manually slid to an open position, providing an aperture of adjustable width permitting to use the aperture as a firing slit for weapons of various sizes. The portion of the bulletproof glass block or pane registering with the remaining of the opening in the body shell provides considerable peripheral vision for the occupants of the vehicle, while still protecting them from direct hit from the outside. Furthermore, the invention contemplates providing clamping means for adjustably holding securely the block or pane of bulletproof glass in any partially open position, such that the firing slit thus provided may be precisely adjusted as a function of the size of the weapon in use and the aiming swing required. In addition, the present invention provides a simple and easily disassembled support or mount for a framed block or pane of heavy bulletproof glass such that damaged windows or windshields can be rapidly and easily replaced by the crew.

SUMMARY OF THE INVENTION

The present invention accomplishes its many objects and advantages by providing a support or mount for a frame holding a block or pane of bulletproof glass, permitting the frame to be easily and effortlessly slid from a position obturating an opening in a vehicle body shell, to an infinite number of positions unmasking a desired area of the opening. Clamping means are provided for securely holding the framed block or pane of glass in closed position as well as in any partially open position and in fully open position. The frame support or mount is further arranged such that the framed block or pane of glass may be entirely removed when desired such as, for example, for replacement with a new block or pane of bulletproof glass, when damaged.

The many objects and advantages of the present invention will become apparent to those skilled in the art when the following description of the best modes contemplated for practicing the invention is read in conjunction with the accompanying drawing wherein like numerals refer to like or equivalent parts, and in which:

BRIEF DESCRIPTION OF THE DRAWING

FIG. 1 is a partial schematic view of an armored car body provided with slidable and removable windows according to the present invention;

FIG. 2 is a partial sectional view along line 2—2 of FIG. 1;

FIG. 2a is a partial view similar to FIG. 2 but showing a modification thereof;

FIG. 3 is an elevation view of the slidable and removable window of FIGS. 1-2, as seen from the interior of the armored car, namely as seen from line 3—3 of FIG. 2;

FIG. 4 is a partial top plan view of an armored car body shell illustrating a slidable and removable windshield window according to the present invention;

FIG. 5 is a partial sectional view along line 5—5 of FIG. 4; and

FIG. 6 is an elevation view, as seen from line 6—6 of FIG. 5, that is from the interior of the armored car body shell.

DETAILED DESCRIPTION OF THE PREFERRED EMBODIMENTS

As illustrated at FIG. 1, an armored car 10 is in the form of a body shell 12 mounted on an appropriate motor vehicle frame, not shown. The body shell 12 is made of a moulding cast of high strength steel or, in the alternative and as illustrated, is made of panels of armored plates welded together at their edges such as to form a complete enclosure. The body shell 12 is provided with appropriate port openings 14 formed as cut-outs in the sidewalls 15 of the body shell 12, in the side doors 16 and rear doors, not shown, permitting the crew or occupants to gain access to the enclosure formed by the body shell 12. Each opening 14 is provided with a slidable and removable window assembly 18.

As shown in more detail at FIGS. 2 and 3, the slidable and removable window assembly 18 comprises a pane or block 20 of bulletproof glass secured in a rectangular or square metallic frame 22. The frame 22 is made of four separate abutting lengths of U-shaped channel member or, in the alternative and preferably as illustrated, of four lengths of L-shaped channel member, held together by any convenient means such as fasteners or welding, so as to enclose and frame the pane or block 20 of glass. A felt gasket, not shown, or a gasket of convenient resilient or glazing material may be disposed between the edge of the pane or block 20 and the interior surface of the frame 22.

The lower edge 24 of the frame 22 is provided with a pair of rollers 26 rotatably mounted thereon by means of a pair of brackets 28 and 30, a pin 32, press-fitted through aligned apertures 34 and 36 disposed respectively in the brackets 28 and 30, rotatably supporting the roller 26. The frame 22 is thus supported at its bottom by the rollers 26 engaged in a channelway 38 consisting, in the example illustrated, of a channel strip in the form of an angle-iron 39 having an edge 40, FIG. 2, welded to the interior surface of the body shell 12, and thus forming between such interior surface and the bent-over section 42 of the angle-iron channel strip 39 a U-shaped channelway 38 disposed parallel to the lower edge of the opening 14, proximate thereto and with the bottom surface 44 of the channelway 38 rollably supporting the rollers 26.

The end 46 of the pin 32 projects to an appropriate distance for slidably engaging the interior surface of the channelway side wall defined by the bent-over portion 42 of the angle-iron channel strip 39, such as to engage the edge of the frame 22 disposed towards the outside of the shell 12 in tight but sliding engagement with the interior surface of the shell 12 proximate the edge of the opening 14. The upper edge 48 of the frame 22 is slidably held by means of an angle-iron channel strip 50 having a section 52 disposed generally perpendicular to the inner surface of the body shell 12, with its end 54 abutting thereagainst. The channel strip 50 has a bent-over portion 56 having an inner surface engaging an elongated plate or strip 58 fastened, such as by welding, on the upper edge 48 of the frame 22. A pair of studs 60 are welded to the interior surface of the shell 12, and each stud has a threaded end 62 projecting through an aperture 64 formed through the wall of the bent-over portion 56 of the angle-iron channel strip 50. A wing nut 66 permits to removably hold in position the angle-iron channel strip 50. A small steel block 68 welded, or otherwise fastened, to the interior surface of the shell 12 may be used, if so desired, to help in locating the position of the channel strip 50 and prevent skewing it and thus overtightening the assembly when the wing nut 66 is manually screwed down.

The glass block or pane 20 has overall dimensions slightly larger than the overall dimensions of the opening 16, and is mounted at a location relative to the opening 18 so as to overlap the opening edges at the bottom and the top, and such as to overlap the lateral edges of the opening when fully closed. The mounting of the window frame 22 by the structure illustrated permits the frame to easily slide as supported by the lower and upper channelways, the rollers 26 assuring that in spite of the great weight of the glass block or pane 20, displacement of the window frame 22 is longitudinally effected with a minimum of effort.

Means are provided for clamping the window either shut or in any intermediary open position. Such means takes the form, for example, of the roller support bracket 30 being in the shape of an elongated plate, the surface of which is engageable by the end of a wing bolt 70 threading through an appropriate threaded aperture 72 through the wall of the bent-over portion 42 of the channelway 39. By tightening the wing bolt 70 against the plate 30, the window frame 22 may be held in any position providing between its side edge and a side edge of the aperture 14 a space or slit 74, adjustable to any desired width, for the passage and aiming of handguns or other weapons, or for ventilation of the interior of the body shell 12. It is to be noted that when the slit 74 is used for aiming a weapon, the block or pane 20 of bulletproof glass still covers an appreciable area of the opening 14, thus offering adequate protection to the vehicle occupants while still permitting them to enjoy an unobscured peripheral view.

When it is desired to remove the window frame 22 from its mount, either for replacement or for any other reason, the wing nuts 66 are removed, thus permitting to remove the angle-iron channelstrip 50. The window frame 22 may thus be lifted slightly so as to remove the rollers 26 from the lower channelway 38 for removal of the window frame from over the opening 14. After positioning a new window frame assembly with its rollers 26 engaged within the lower channelway 39, the upper angle-iron channel strip 50 is placed back in position, and the wing nuts 66 tightened sufficiently over the studs 60 to insure sturdy holding of the framed block or pane of glass in position while permitting free sliding back and forth of the framed block or pane over the opening.

As illustrated at FIG. 2a, the upper retaining plate or strip 58 may be omitted, and the angle-iron channel strip 50 arranged such that the inner surface of its bent-over portion 56 slidably engages the outer surface of the frame 22 at its upper portion. Such an arrangement obviously requires that the inner surface of the frame 22 at its upper portion be adequately straight and relatively smooth such as to slidably engage with the inner surface of the bent-over portion 56 of the channel bracket 50 without too much friction or binding.

If so desired one, or more, drain hole 78 (FIG. 2) may be drilled through the sidewall of the body shell in registry with the bottom of the channelway 38 to drain any water that may accumulate at the bottom of the channelway.

Referring now to FIG. 4, there is illustrated a top plan view of the body shell 12 of the armored vehicle 10. Windshield windows 80 are disposed behind substantially rectangular apertures 82 formed in an inclined panel 84 facing forward relative to the normal direction of travel of the armored vehicle 10.

According to the present invention, at least one of the windshield windows 80 is made slidable and removable, according to the structure best illustrated in detail in FIGS. 5 and 6. The windshield window 80 is constructed and held slidably and removably behind the aperture 82 in the same manner and by the same means as illustrated at FIGS. 2–3 with respect to the slidable and removable side windows 18. The only difference in structure is the provision of one or more rollers 86 mounted on the upper edge 48 of the frame 22. Each roller 86 is supported in rotation by a pin 88 press-fitted or otherwise fastened through aligned apertures in a block 90. The block 90 is provided with a slot 92 through which the roller 86 is disposed, the peripheral edge 94 of the roller 86 projecting from the block and engaging the inner surface of the bent-over portion 56 of the upper removable angle-iron channel strip 50. The roller supporting block 90 is welded or otherwise fastened to the upper edge 48 of the frame 22.

In this manner, the upper portion of the inclined frame 22 is supported from the angle-iron channel strip 50 through the periphery of the rollers 86, thus considerably reducing friction and, consequently, the force that must be applied to the windshield assembly 80 for displacing it from a fully closed to a partially open or fully open position.

An arrangement such as illustrated at FIGS. 5-6 is the preferable structure for slidably and removably supporting window assemblies such as a windshield, which are disposed at an angle relative to the vertical, in view of the considerable weight of the window assembly when the glass pane or block 20 is made of heavy thick bulletproof glass. It will be appreciated that a pair of rollers such as rollers 86 may also be mounted on the lower edge 24 of the window frame 22 to provide a lateral thrust roller bearing support for both the top and the bottom of the window assembly. It will also be appreciated that in structures in which a window assembly is normally disposed to obturate an aperture in a vertically disposed panel, as illustrated at FIGS. 2-3, side thrust rollers may be mounted on the top, as well as at the bottom of the window assembly, to provide side thrust roller support for both sides of the upper and lower channelways.

Having thus described the present invention by way of practical structural embodiments thereof, modifications whereof will be apparent to those skilled in the art, what is claimed as new is as follows:

1. A slidable and removable window for an armored car porthole in the form of an opening through the wall of the body of said armored car, said window comprising a frame of adequate over-all dimension to overlap said opening, a pane of bulletproof glass mounted in said frame, a pair of spaced-apart rollers mounted on the bottom of said frame, a channelway fastened to the interior of said body proximate to the lower edge of said opening and substantially parallel thereto, said channelway forming a track for said rollers for movably supporting said window frame, a bracket strip in the form of an angle-iron removably mounted substantially parallel to and proximate to the upper edge of said opening with a section thereof having an edge abutting the interior surface of said body and another portion thereof spaced apart and substantially parallel to said interior surface, and retaining means dependent from the upper portion of said frame for engagement with a portion of said bracket strip extending parallel to the interior surface of said body for movably and removably retaining said frame.

2. The window of claim 1 wherein said retaining means comprises a surface of said frame.

3. The window of claim 1 wherein said retaining means comprises an elongated plate mounted on the upper edge of said frame.

4. The window of claim 1 wherein said retaining means comprises at least one roller mounted on the upper edge of said frame with its axis of rotation substantially parallel to said portion of said second strip disposed substantially parallel to said interior surface and having a peripheral edge in rolling engagement with said portion.

5. The window of claim 1 wherein the means for removably holding said bracket strip comprises a pair of studs projecting from said body interior surface each having a threaded end passed through an aperture in said other portion of said bracket strip, and a nut threaded on said threaded end for holding said bracket strip in position.

6. The window of claim 5 wherein said nut is a wing nut.

7. The window of claim 1 wherein said rollers are mounted on said frame by means of a pair of substantially parallel brackets and a pin rotatably supporting each of said rollers is press-fitted through aligned apertures in said brackets, one end of said pin projecting such as to slidably engage the interior surface of said other portion of said bracket strip extending substantially parallel to the interior surface of said body.

8. The window of claim 1 further comprising means for immobilizing said window relative to said opening.

9. The window of claim 8 wherein said means immobilizing said window comprises at least one wing bolt threading through an aperture disposed through a wall of said channelway, said wing bolt having an end engageable with a plate member dependent from the lower edge of said frame.

* * * * *